(12) United States Patent
Batchelor et al.

(10) Patent No.: US 10,081,785 B2
(45) Date of Patent: Sep. 25, 2018

(54) DYE POLYMER

(71) Applicant: Conopco, Inc., Englewood Cliffs, NJ (US)

(72) Inventors: Stephen Norman Batchelor, Chester (GB); Jayne Michelle Bird, Ellesmere Port (GB); Karen Maria Devine, Bromborough (GB)

(73) Assignee: Conopco, Inc., Englewood Cliffs, NJ (US)

( * ) Notice: Subject to any disclaimer, the term of this patent is extended or adjusted under 35 U.S.C. 154(b) by 112 days.

(21) Appl. No.: 14/915,305

(22) PCT Filed: Sep. 12, 2014

(86) PCT No.: PCT/EP2014/069565
§ 371 (c)(1),
(2) Date: Feb. 29, 2016

(87) PCT Pub. No.: WO2015/039977
PCT Pub. Date: Mar. 26, 2015

(65) Prior Publication Data
US 2016/0215239 A1 Jul. 28, 2016

(30) Foreign Application Priority Data
Sep. 17, 2013 (EP) .................................... 13184722

(51) Int. Cl.
| | | |
|---|---|---|
| *C11D 1/00* | (2006.01) | |
| *C11D 3/30* | (2006.01) | |
| *C11D 3/37* | (2006.01) | |
| *C11D 3/42* | (2006.01) | |
| *C11D 3/40* | (2006.01) | |
| *C11D 11/00* | (2006.01) | |
| *C09B 69/10* | (2006.01) | |
| *C09B 62/443* | (2006.01) | |

(52) U.S. Cl.
CPC .............. *C11D 3/42* (2013.01); *C09B 62/443* (2013.01); *C09B 69/101* (2013.01); *C09B 69/106* (2013.01); *C09B 69/109* (2013.01); *C11D 3/30* (2013.01); *C11D 3/3723* (2013.01); *C11D 3/40* (2013.01); *C11D 11/0017* (2013.01)

(58) Field of Classification Search
CPC .......... C11D 3/30; C11D 3/3723; C11D 3/40; C11D 11/0017
USPC ..................................... 510/475, 499; 8/137
See application file for complete search history.

(56) References Cited

U.S. PATENT DOCUMENTS

| | | | |
|---|---|---|---|
| 4,182,612 | A | 1/1980 | Sokol et al. |
| 4,962,190 | A | 10/1990 | Mayer |
| 5,565,145 | A | 10/1996 | Watson et al. |
| 5,858,948 | A | 1/1999 | Ghosh et al. |
| 5,968,893 | A | 10/1999 | Manohar et al. |
| 6,004,922 | A | 12/1999 | Watson et al. |
| 6,191,093 | B1 | 2/2001 | Watson |
| 6,291,415 | B1 | 9/2001 | Watson et al. |
| 7,754,671 | B2 | 7/2010 | Lin et al. |
| 8,318,653 | B2 | 11/2012 | Misske et al. |
| 2016/0215239 | A1 | 7/2016 | Batchelor et al. |

FOREIGN PATENT DOCUMENTS

| | | |
|---|---|---|
| CN | 101768372 | 7/2010 |
| CN | 101855272 | 10/2010 |
| EP | 0317859 | 5/1989 |
| WO | WO9901530 | 1/1999 |
| WO | WO2009060059 | 5/2009 |
| WO | WO2010148624 | 12/2010 |
| WO | WO2011047987 | 4/2011 |
| WO | WO2012119821 | 9/2012 |
| WO | WO2012119859 | 9/2012 |
| WO | WO2012126665 | 9/2012 |
| WO | WO2013171210 | 11/2013 |
| WO | WO2013171211 | 11/2013 |
| WO | WO2013171212 | 11/2013 |
| WO | WO2015039977 | 3/2015 |
| WO | WO2015110291 | 7/2015 |

OTHER PUBLICATIONS

Kelu Yan, Course in Dyeing and Finishing Technology, China Textile & Apparel Press, 2005, pp. 222-223 With translation, vol. 1.
Search Report & Written Opinion EP13184721 dated Nov. 18, 2013.
Search Report & Written Opinion in EP13184722 dated Nov. 18, 2013.
Search Report & Written Opinion in PCTEP2014069564 dated Nov. 28, 2014.
Search Report & Written Opinion in PCTEP2014069565 dated Nov. 28, 2014.

*Primary Examiner* — Gregory R Delcotto
(74) *Attorney, Agent, or Firm* — Greenberg Traurig, LLP

(57) ABSTRACT

The present invention provides dye polymers.

14 Claims, No Drawings

DYE POLYMER

FIELD OF INVENTION

The present invention concerns dye polymers and the use of the dye polymers in laundry compositions.

BACKGROUND OF THE INVENTION

WO2011/047987 discloses a reactive dye covalently bound to polyethyleneimine polymers for used in laundry detergent formulations to whiten fabric.

WO2012/119859 discloses a dye polymer comprising a core polyamine of which from 60 to 100 mol % of the primary and secondary amines of the core polyamine are alkoxylated and from 0.1 to 30 mol % of the primary and secondary amines of the core polyamine are covalently bound to a reactive dye.

U.S. Pat. No. 5,565,145 discloses alkoxylated ethylene imine polymers without dyes present; the alkoxylated ethylene imine polymers are disclosed as soil dispersing agents.

CN 101 768 372 discloses a reactive red dye bound to a propoxylated polyethylene imine as an antibacterial cation reactive dye.

There is a need to improve the deposition of reactive dyes covalently bound to polyethyleneimines to fabrics under domestic laundry conditions.

SUMMARY OF THE INVENTION

We have found that the dye polymers of the present invention exhibit improved deposition to textiles.

In one aspect the present invention provides a blue or violet dye polymer, comprising a polyethylene imine covalently bound to a reactive dye, the polyethylene imine having from 6 to 1000000, preferably 6 to 50 000, more preferably from 10 to 200, most preferably from 15 to 45, amine nitrogen atoms, wherein from 20 to 95 mol %, most preferably 57 to 80 mol %, of the totality of the protons of the primary and secondary amine nitrogen atoms of the unsubstituted polyethylene imine are substituted by isopropyl alcohol groups.

In another aspect the present invention provides a laundry composition comprising from 0.001 to 2.0 wt %, preferably 0.05 to 0.2 wt %, of the dye polymer and from 2 to 70 wt % of surfactant.

In a further aspect the present invention provides a domestic method of treating a laundry textile, the method comprising the steps of:
(i) treating a textile with an aqueous solution of the dye polymer as defined in any one of claims 1 to 10, the aqueous solution comprising from 10 ppb to 5000 ppm, preferably 50 ppb to 2 ppm, of the dye polymer; and, from 0.0 g/L to 6 g/L of a surfactant, preferably 0.2 to 4 g/L; and,
(ii) optionally rinsing and drying the textile.

In an even further aspect the present invention provides a dye polymer obtainable by reacting a polyethylene imine with propylene oxide followed by reaction with a reactive dye.

In even further aspect the present invention provides a dye polymer obtainable by reacting a polyethylene imine with a reactive dye followed by reaction with propylene oxide.

DETAILED DESCRIPTION OF THE INVENTION

Dye

The reactive dye is blue or violet. Deposition of blue or violet dyes enhances the whiteness of white fabrics.

Many Reactive dyes are listed in the Colour Index (Society of Dyers and Colourists/American Association of Textile Chemists and Colorists). Reactive dyes are discussed in Industrial Dyes (edited by K. Hunger).

The reactive dye comprises a chromophore covalently linked to one or more reactive groups. The reactive group reacts with an NH or OH group, preferably an NH of the polymer to covalently bind the dye to the dye polymer. The amine is far more nucleophilic than the hydroxyl group and will preferentially react with the reactive dye. For example, for an $NH_2$ group as illustrated below:

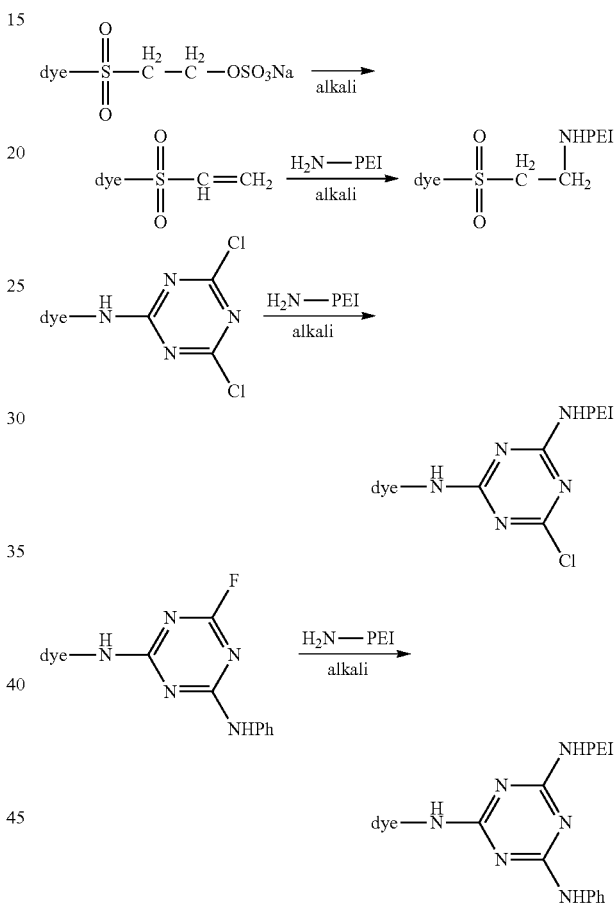

Chromophores may be selected from anthraquinone, phenazine, triphenodioxazine, mono-azo, bis-azo, polyazo, formazan and phthalocyanin.

The reactive group is preferably selected from heterocyclic reactive groups; 2-bromoprop-2-enamido; 2,3-dibromopropanamido; and, a sulfooxyethylsulfonyl reactive group ($-SO_2CH_2CH_2OSO_3Na$).

2-bromoprop-2-enamido reactive group has the structure:

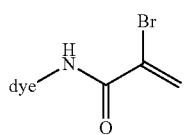

2,3-dibromopropanamido reactive group has the structure:

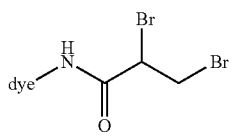

The heterocyclic reactive groups are preferably nitrogen containing aromatic rings bound to a halogen or an ammonium group, which react with $NH_2$ or NH groups of the polymers to form a covalent bond. The halogen is preferred. More preferred heterocyclic reactive groups are dichlorotriazinyl, difluorochloropyrimidine, monofluorotrazinyl, monofluorochlorotrazinyl, dichloroquinoxaline, difluorotriazine, monochlorotriazinyl, and trichloropyrimidine.

The reactive group may be linked to the dye chromophore via an alkyl spacer for example: dye-NH—$CH_2CH_2$-reactive group.

Especially preferred heterocylic reactive groups are:

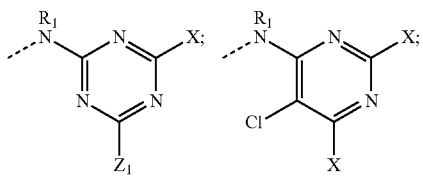

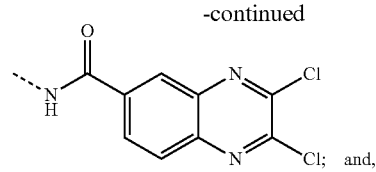

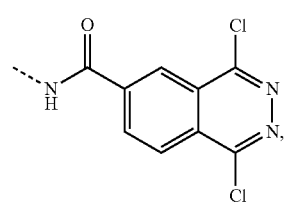

wherein $R_1$ is selected from H or alkyl, preferably H.

X is selected from F or Cl.

When X=Cl, $Z_1$ is selected from —Cl, —$NR_2R_3$, —$OR_2$, —$SO_3Na$

When X=F, $Z_1$ is selected from —$NR_2R_3$ $R_2$ and $R_3$ are independently selected from H, alkyl and aryl groups. Aryl groups are preferably phenyl and are preferably substituted by —$SO_3Na$ or —$SO_2CH_2CH_2OSO_3Na$. Alkyl groups are preferably methyl or ethyl.

Preferred examples of reactive dyes are:

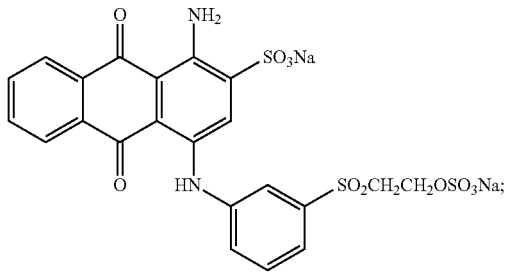

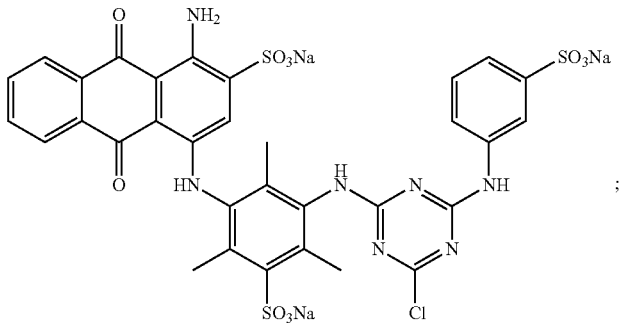

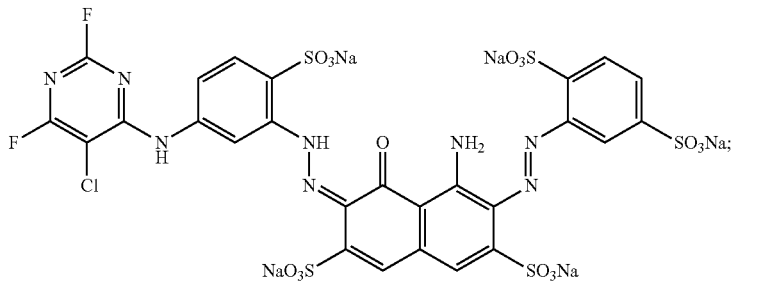

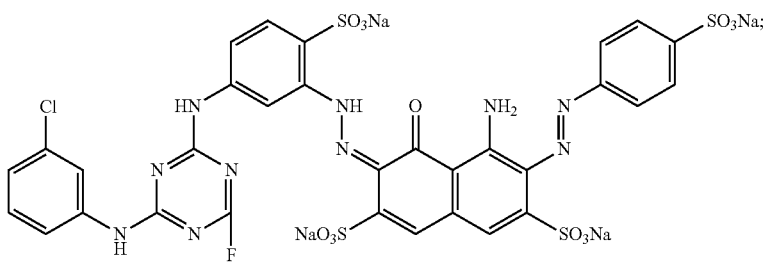

-continued
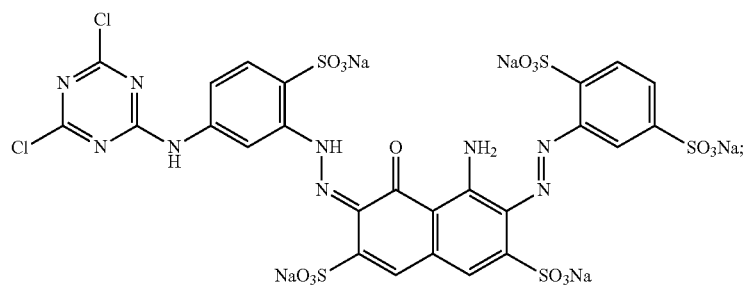
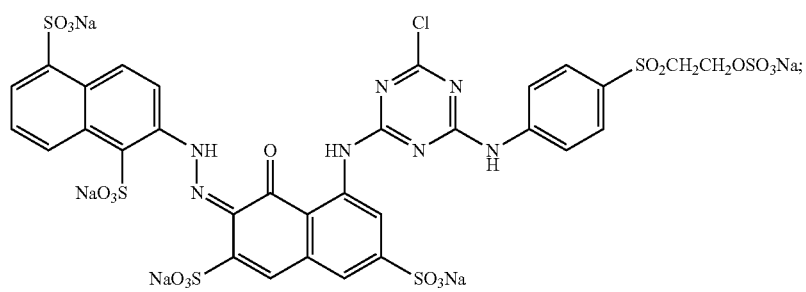
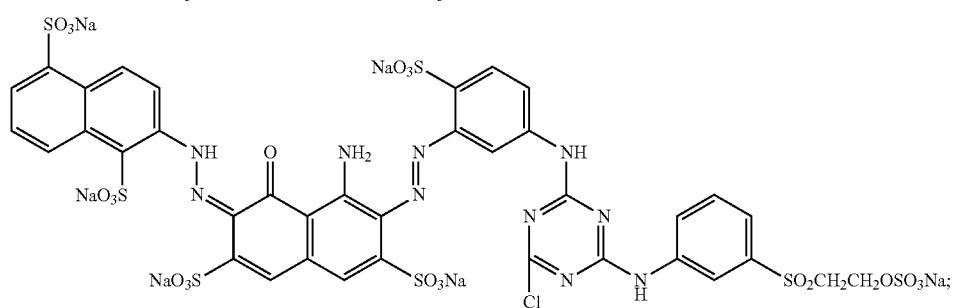
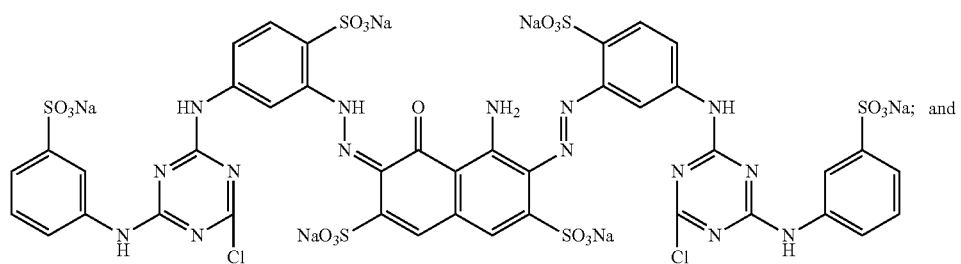
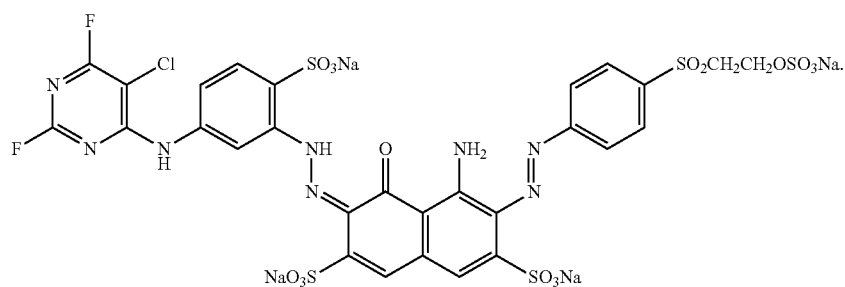

The reactive dye is preferably selected from mono-azo, bis-azo and anthraquinone dyes, most preferably anthraquinone dyes.

The reactive anthraquinone dye comprises an anthraquinone dye covalently linked to a reactive group. The reactive group reacts with an NH of the polymer to covalently bind the dye to the polymer.

A preferred anthraquinone dye is

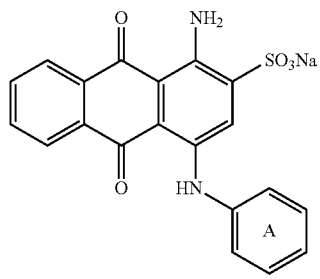

Where the A ring is substituted by a reactive group. preferably the A ring is substituted by a reactive group selected from: dichlorotriazinyl; difluorochloropyrimidine; monofluorotrazinyl; monofluorochlorotrazinyl; dichloroquinoxaline; difluorotriazine; monochlorotriazinyl; trichloropyrimidine 2-bromoprop-2-enamido; 2,3-dibromopropanamido; and, a sulfooxyethylsulfonyl reactive group (—SO$_2$CH$_2$CH$_2$OSO$_3$Na).

The A ring may be further substituted by organic groups preferably selected from alkyl and SO$_3$Na. The alkyl group is preferably C1-C8-alkyl, most preferably methyl.

Preferred reactive anthraquinone dyes are: Reactive blue 1; Reactive blue 2; Reactive blue 4; Reactive blue 5; Reactive blue 6; Reactive blue 12; Reactive blue 16; reactive blue 19; Reactive blue 24; Reactive blue 27; Reactive blue 29; Reactive blue 36; Reactive blue 44; Reactive blue 46; Reactive blue 47; reactive blue 49; Reactive blue 50; Reactive blue 53; Reactive blue 55; Reactive blue 61; Reactive blue 66; Reactive blue 68; Reactive blue 69; Reactive blue 74; Reactive blue 86; Reactive blue 93; Reactive blue 94; Reactive blue 101; Reactive blue 103; Reactive blue 114; Reactive blue 117; Reactive blue 125; Reactive blue 141; Reactive blue 142; Reactive blue 145; Reactive blue 149; Reactive blue 155; Reactive blue 164; Reactive blue 166; Reactive blue 177; Reactive blue 181; Reactive blue 185; Reactive blue 188; Reactive blue 189; Reactive blue 206; Reactive blue 208; Reactive blue 246; Reactive blue 247; Reactive blue 258; Reactive blue 261; Reactive blue 262; Reactive blue 263; Reactive blue 172; Reactive Violet 22; Reactive Violet 31; and, Reactive Violet 34.

The dyes are listed according to Colour Index (Society of Dyers and Colourists/American Association of Textile Chemists and Colorists) classification.

Reactive Red Dye

A Reactive Red dye may also be bound to the polymer preferably in a mol ratio of 1:100 to 1:4 with the anthraquinone reactive dye. This provides a more violet red shade to the polymer. The Reactive Red dye is preferably a mono-azo dye.

PEI Polymer

Polyethyleneimines (PEI) are formed by ring opening polymerisation of ethyleneimine.

PEI's are usually highly branched polyamines characterized by the empirical formula (C$_2$H$_5$N)$_n$ with a molecular mass of 43.07 (as repeating units). They are commercially prepared by acid-catalyzed ring opening of ethyleneimine, also known as aziridine. (The latter, ethyleneimine, is prepared through the sulphuric acid esterification of ethanolamine).

All polyethylene imine (PEIs) of the present invention contain primary and secondary amines. Preferably tertiary amines are present in the PEI.

The Nitrogen of the dye-polymer may be further substituted by other groups, for example an alkyl group, or an alkyl sulphate group, or an alkyl aryl group or an alkyl aryl sulphate group.

Dye-Polymer

The unsubstituted polyethylene imine is the polyethylene imine before reaction with the reactive dye or propoxylation. From an unsubstituted polyethylene imine a propoxylated polyethylene imine (polyethylene imine substituted by isopropyl alcohol groups) is formed, this propoxylated polyethylene imine is then reacted with a reactive dye. Alternatively, an unsubstituted polyethylene imine is reacted with a reactive dye which is subsequently propoxylated.

It is evident from the present disclosure that propoxylation of the polyethylene imine provides —CH$_2$—CH(OH)—CH$_3$ substituent such that the unsubstituted polyethylene imine is substituted by iso-propyl alcohol groups.

The propoxylation is preferably accomplished by the reaction of polymer with propylene oxide, for example:

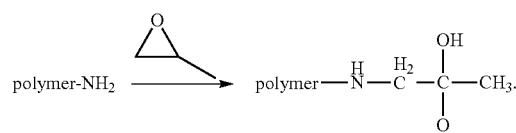

An example synthesis of the dye-polymer is shown below

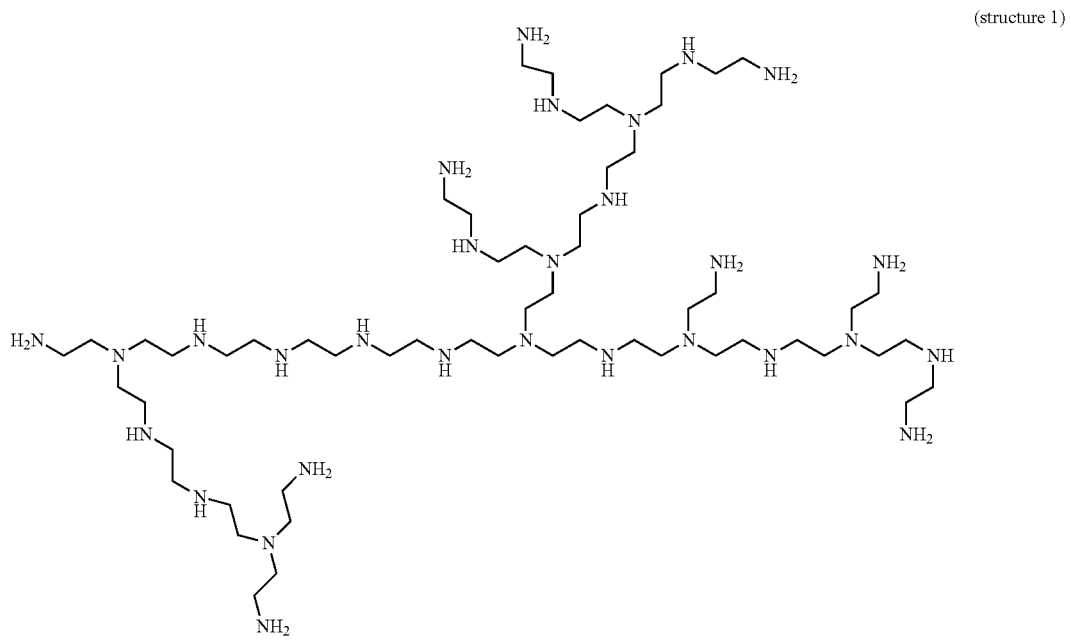 [SMILES: NCCNCCN(CCN)CCNCCN(CCN)CCNCCN(CCNCCNCCNCCNCCN(CCN)CCNCCNCCN(CCN)CCN)CCN(CCNCCN)CCNCCN(CCNCCN)CCNCCN]
(structure 1)

An unsubstituted PEI (structure 1) containing 29 nitrogen atoms of which 9 are primary (i.e. NH$_2$), 13 are secondary (i.e. NH) and 7 are tertiary, is reacted with 26 mol equivalents of propylene oxide to give the structure below (structure 2).

The unsubstituted PEI (structure 1) contained (2×9)+(1×13)=31 protons of the primary and secondary nitrogens. When reacted with 26 mol equivalents of to propylene oxide, 26/31×100=83.9 mol % of the protons of the primary and secondary nitrogens have been replaced by an isopropyl alcohol groups (structure 2).

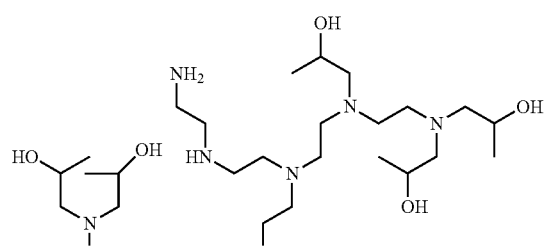
(structure 2)

-continued
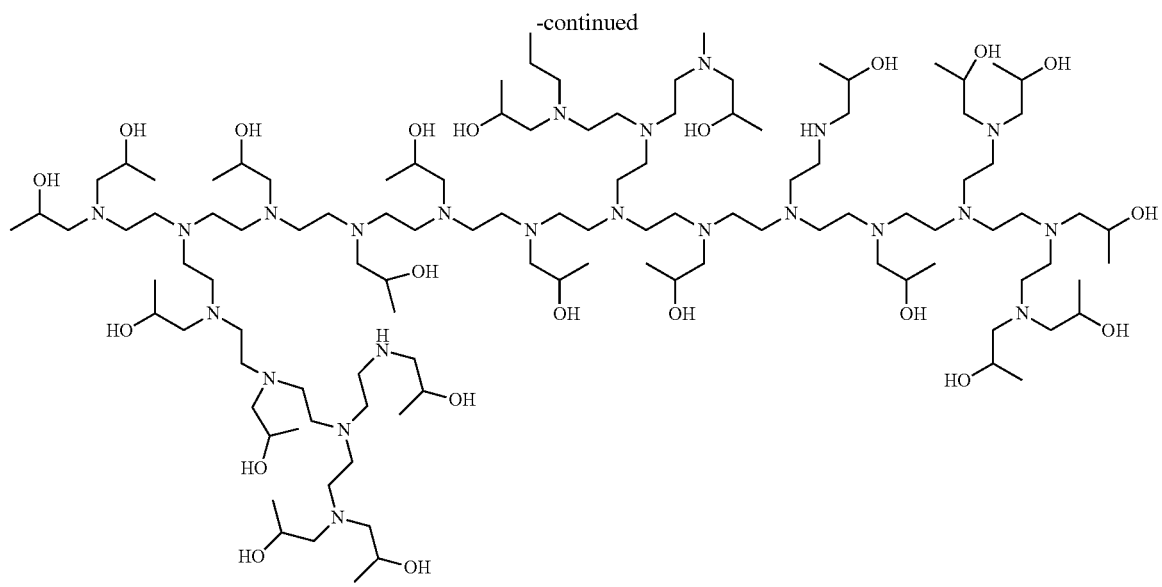
The propoxylated PEI (Structure 2) is then reacted with 1 mol equivalent of the dye Reactive Blue 49 to produce the dye-polymer (structure 3) of the invention.
(structure 3)
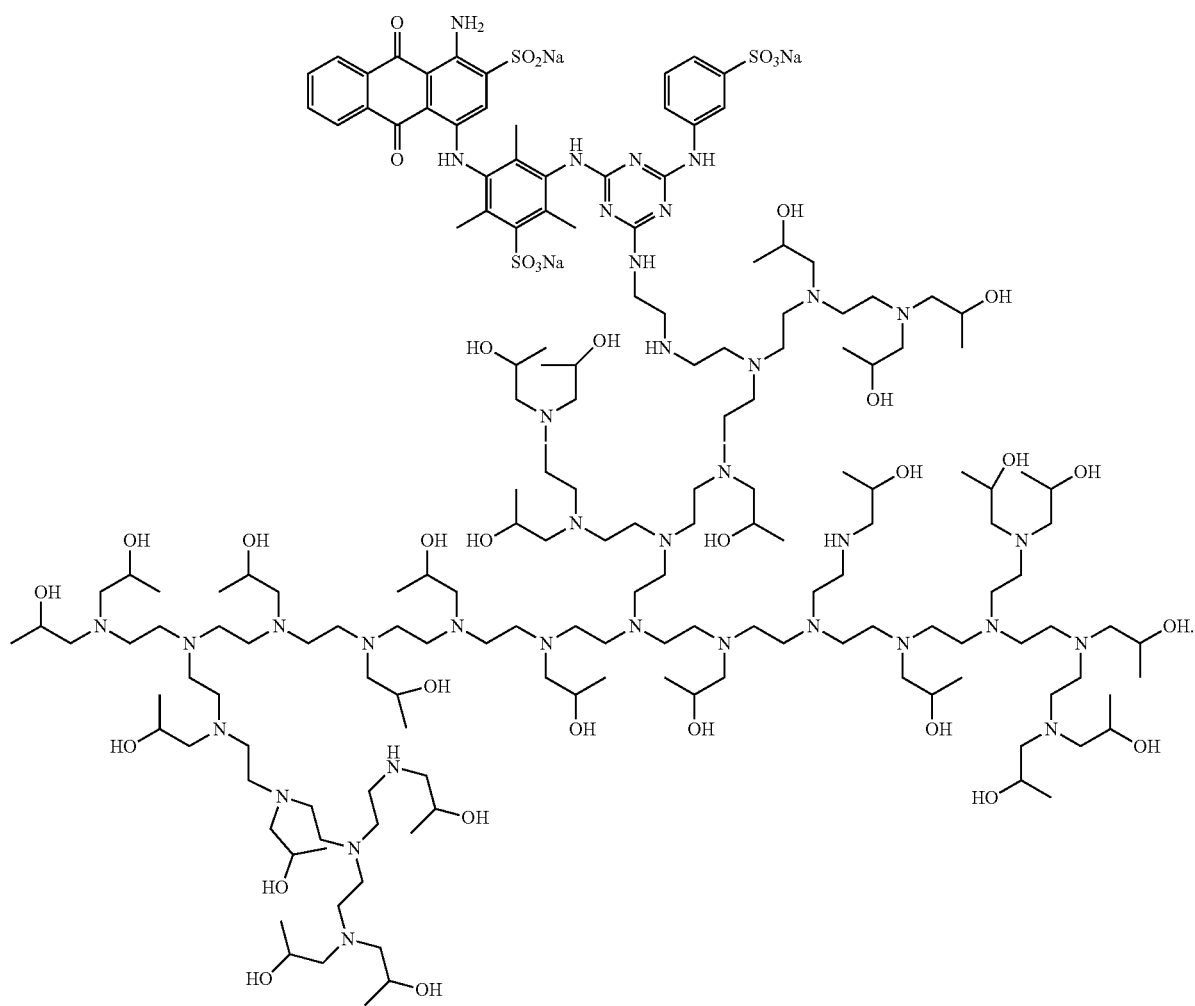

In above structure the illustrated the propoxylated PEI carries one dye chromophore. The dye polymers can carry a plurality of reactive dyes.

The reactive group of the reactive dye preferably reacts with an NH group of the propoxylated PEI.

Preferably the dye-polymer contains 1 to 30 wt % of dye. In structure 3 the molecular weight of the dye polymer is 3578.7 of which 846.7 is the dye, the wt % of dye on the dye-polymer is 846.7/3578.7×100=23.65 wt %.

When the polyethylene imine has from 10 to 200, most preferably from 15 to 45, amine nitrogen atoms, the mole ratio of reactive dye to polymer is from 0.2:1 to 1:1.

Reactive dyes with 2 reactive groups may cross-link the polymer, so that it is attached to 2 polymer chains. Preferably the reactive dye is only attached to one polymer.

Surfactant

The laundry composition comprises from 2 to 70 wt percent of a surfactant, most preferably 10 to 30 wt %. In general, the nonionic and anionic surfactants of the surfactant system may be chosen from the surfactants described "Surface Active Agents" Vol. 1, by Schwartz & Perry, Interscience 1949, Vol. 2 by Schwartz, Perry & Berch, Interscience 1958, in the current edition of "McCutcheon's Emulsifiers and Detergents" published by Manufacturing Confectioners Company or in "Tenside-Taschenbuch", H. Stache, 2nd Edn., Carl Hauser Verlag, 1981. Preferably the surfactants used are saturated.

Suitable nonionic detergent compounds which may be used include, in particular, the reaction products of compounds having a hydrophobic group and a reactive hydrogen atom, for example, aliphatic alcohols, acids, amides or alkyl phenols with alkylene oxides, especially ethylene oxide either alone or with propylene oxide. Specific nonionic detergent compounds are $C_6$ to $C_{22}$ alkyl phenol-ethylene oxide condensates, generally 5 to 25 EO, i.e. 5 to 25 units of ethylene oxide per molecule, and the condensation products of aliphatic $C_8$ to $C_{18}$ primary or secondary linear or branched alcohols with ethylene oxide, generally 5 to 40 EO, preferably 7EO to 9EO.

Suitable anionic detergent compounds which may be used are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher $C_8$ to $C_{18}$ alcohols, produced for example from tallow or coconut oil, sodium and potassium alkyl $C_9$ to $C_{20}$ benzene sulphonates, particularly sodium linear secondary alkyl $C_{10}$ to $C_{15}$ benzene sulphonates; and sodium alkyl glyceryl ether sulphates, especially those ethers of the higher alcohols derived from tallow or coconut oil and synthetic alcohols derived from petroleum. The preferred anionic detergent compounds are sodium $C_{11}$ to $C_{15}$ alkyl benzene sulphonates and sodium $C_{12}$ to $C_{18}$ alkyl sulphates. Also applicable are surfactants such as those described in EP-A-328 177 (Unilever), which show resistance to salting-out, the alkyl polyglycoside surfactants described in EP-A-070 074, and alkyl monoglycosides.

Preferred surfactant systems are mixtures of anionic with nonionic detergent active materials, in particular the groups and examples of anionic and nonionic surfactants pointed out in EP-A-346 995 (Unilever). Especially preferred is surfactant system that is a mixture of an alkali metal salt of a $C_{16}$ to $C_{18}$ primary alcohol sulphate together with a $C_{12}$ to $C_{15}$ primary alcohol 3 to 7 EO ethoxylate.

The nonionic detergent is preferably present in amounts less than 50 wt %, most preferably less than 20 wt % of the surfactant system. Anionic surfactants can be present for example in amounts in the range from about 50% to 100 wt % of the surfactant system.

In another aspect which is also preferred the surfactant may be a cationic such that the formulation is a fabric conditioner.

Cationic Compound

When the present invention is used as a fabric conditioner it needs to contain a cationic compound.

Most preferred are quaternary ammonium compounds.

It is advantageous if the quaternary ammonium compound is a quaternary ammonium compound having at least one $C_{12}$ to $C_{22}$ alkyl chain.

It is preferred if the quaternary ammonium compound has the following formula:

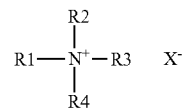

in which $R^1$ is a $C_{12}$ to $C_{22}$ alkyl or alkenyl chain; $R^2$, $R^3$ and $R^4$ are independently selected from $C_1$ to $C_4$ alkyl chains and $X^-$ is a compatible anion. A preferred compound of this type is the quaternary ammonium compound cetyl trimethyl quaternary ammonium bromide.

A second class of materials for use with the present invention are the quaternary ammonium of the above structure in which $R^1$ and $R^2$ are independently selected from $C_{12}$ to $C_{22}$ alkyl or alkenyl chain; $R^3$ and $R^4$ are independently selected from $C_1$ to $C_4$ alkyl chains and $X^-$ is a compatible anion.

A detergent composition according to claim 1 in which the ratio of (ii) cationic material to (iv) anionic surfactant is at least 2:1.

Other suitable quaternary ammonium compounds are disclosed in EP 0 239 910 (Procter and Gamble).

It is preferred if the ratio of cationic to nonionic surfactant is from 1:100 to 50:50, more preferably 1:50 to 20:50.

The cationic compound may be present from 1.5 wt % to 50 wt % of the total weight of the composition. Preferably the cationic compound may be present from 2 wt % to 25 wt %, a more preferred composition range is from 5 wt % to 20 wt %.

The softening material is preferably present in an amount of from 2 to 60% by weight of the total composition, more preferably from 2 to 40%, most preferably from 3 to 30% by weight.

The composition optionally comprises a silicone.

Builders or Complexing Agents

Builder materials may be selected from 1) calcium sequestrant materials, 2) precipitating materials, 3) calcium ion-exchange materials and 4) mixtures thereof.

Examples of calcium sequestrant builder materials include alkali metal polyphosphates, such as sodium tripolyphosphate and organic sequestrants, such as ethylene diamine tetra-acetic acid.

Examples of precipitating builder materials include sodium orthophosphate and sodium carbonate.

Examples of calcium ion-exchange builder materials include the various types of water-insoluble crystalline or amorphous aluminosilicates, of which zeolites are the best known representatives, e.g. zeolite A, zeolite B (also known as zeolite P), zeolite C, zeolite X, zeolite Y and also the zeolite P-type as described in EP-A-0,384,070.

The composition may also contain 0-65% of a builder or complexing agent such as ethylenediaminetetraacetic acid, diethylenetriamine-pentaacetic acid, alkyl- or alkenylsuccinic acid, nitrilotriacetic acid or the other builders mentioned below. Many builders are also bleach-stabilising agents by virtue of their ability to complex metal ions.

Zeolite and carbonate (carbonate (including bicarbonate and sesquicarbonate) are preferred builders.

The composition may contain as builder a crystalline aluminosilicate, preferably an alkali metal aluminosilicate, more preferably a sodium aluminosilicate. This is typically present at a level of less than 15% w. Aluminosilicates are materials having the general formula:

$$0.8\text{--}1.5M_2O.Al_2O_3.0.8\text{--}6SiO_2$$

where M is a monovalent cation, preferably sodium. These materials contain some bound water and are required to have a calcium ion exchange capacity of at least 50 mg CaO/g. The preferred sodium aluminosilicates contain 1.5-3.5 $SiO_2$ units in the formula above. They can be prepared readily by reaction between sodium silicate and sodium aluminate, as amply described in the literature. The ratio of surfactants to alumuminosilicate (where present) is preferably greater than 5:2, more preferably greater than 3:1.

Alternatively, or additionally to the aluminosilicate builders, phosphate builders may be used. In this art the term 'phosphate' embraces diphosphate, triphosphate, and phosphonate species. Other forms of builder include silicates, such as soluble silicates, metasilicates, layered silicates (e.g. SKS-6 from Hoechst).

Preferably the laundry detergent formulation is a non-phosphate built laundry detergent formulation, i.e., contains less than 1 wt % of phosphate. Preferably the laundry detergent formulation is carbonate built.

Fluorescent Agent

The composition preferably comprises a fluorescent agent (optical brightener). Fluorescent agents are well known and many such fluorescent agents are available commercially. Usually, these fluorescent agents are supplied and used in the form of their alkali metal salts, for example, the sodium salts. The total amount of the fluorescent agent or agents used in the composition is generally from 0.005 to 2 wt %, more preferably 0.01 to 0.1 wt %. Preferred classes of fluorescer are: Di-styryl biphenyl compounds, e.g. Tinopal (Trade Mark) CBS-X, Di-amine stilbene di-sulphonic acid compounds, e.g. Tinopal DMS pure Xtra and Blankophor (Trade Mark) HRH, and Pyrazoline compounds, e.g. Blankophor SN. Preferred fluorescers are: sodium 2 (4-styryl-3-sulfophenyl)-2H-napthol[1,2-d]triazole, disodium 4,4'-bis{[(4-anilino-6-(N methyl-N-2 hydroxyethyl) amino 1,3,5-triazin-2-yl)]amino}stilbene-2-2' disulfonate, disodium 4,4'-bis{[(4-anilino-6-morpholino-1,3,5-triazin-2-yl)]amino}stilbene-2-2' disulfonate, and disodium 4,4'-bis (2-sulfostyryl)biphenyl.

It is preferred that the aqueous solution used in the method has a fluorescer present. When a fluorescer is present in the aqueous solution used in the method it is preferably in the range from 0.0001 g/l to 0.1 g/l, preferably 0.001 to 0.02 g/l.

Perfume

Preferably the composition comprises a perfume. The perfume is preferably in the range from 0.001 to 3 wt %, most preferably 0.1 to 1 wt %. Many suitable examples of perfumes are provided in the CTFA (Cosmetic, Toiletry and Fragrance Association) 1992 International Buyers Guide, published by CFTA Publications and OPD 1993 Chemicals Buyers Directory 80th Annual Edition, published by Schnell Publishing Co.

It is commonplace for a plurality of perfume components to be present in a formulation. In the compositions of the present invention it is envisaged that there will be four or more, preferably five or more, more preferably six or more or even seven or more different perfume components.

In perfume mixtures preferably 15 to 25 wt % are top notes. Top notes are defined by Poucher (Journal of the Society of Cosmetic Chemists 6(2): 80 [1955]). Preferred top-notes are selected from citrus oils, linalool, linalyl acetate, lavender, dihydromyrcenol, rose oxide and cis-3-hexanol.

Perfume and top note may be used to cue the whiteness benefit of the invention.

It is preferred that the laundry treatment composition does not contain a peroxygen bleach, e.g., sodium percarbonate, sodium perborate, and peracid.

Polymers

The composition may comprise one or more further polymers. Examples are carboxymethylcellulose, poly (ethylene glycol), poly(vinyl alcohol), polycarboxylates such as polyacrylates, maleic/acrylic acid copolymers and lauryl methacrylate/acrylic acid copolymers.

Polymers present to prevent dye deposition, for example poly(vinylpyrrolidone), poly(vinylpyridine-N-oxide), and poly(vinylimidazole), are preferably absent from the formulation.

Enzymes

One or more enzymes are preferred present in a laundry composition of the invention and when practicing a method of the invention.

Preferably the level of each enzyme in the laundry composition of the invention is from 0.0001 wt % to 0.1 wt % protein.

Especially contemplated enzymes include proteases, alpha-amylases, cellulases, lipases, peroxidases/oxidases, pectate lyases, and mannanases, or mixtures thereof.

Suitable lipases include those of bacterial or fungal origin. Chemically modified or protein engineered mutants are included. Examples of useful lipases include lipases from *Humicola* (synonym *Thermomyces*), e.g. from *H. lanuginosa* (*T. lanuginosus*) as described in EP 258 068 and EP 305 216 or from *H. insolens* as described in WO 96/13580, a *Pseudomonas* lipase, e.g. from *P. alcaligenes* or *P. pseudoalcaligenes* (EP 218 272), *P. cepacia* (EP 331 376), *P. stutzeri* (GB 1,372,034), *P. fluorescens, Pseudomonas* sp. strain SD 705 (WO 95/06720 and WO 96/27002), *P. wisconsinensis* (WO 96/12012), a *Bacillus* lipase, e.g. from *B. subtilis* (Dartois et al. (1993), Biochemica et Biophysica Acta, 1131, 253-360), *B. stearothermophilus* (JP 64/744992) or *B. pumilus* (WO 91/16422).

Other examples are lipase variants such as those described in WO 92/05249, WO 94/01541, EP 407 225, EP 260 105, WO 95/35381, WO 96/00292, WO 95/30744, WO 94/25578, WO 95/14783, WO 95/22615, WO 97/04079 and WO 97/07202, WO 00/60063.

Preferred commercially available lipase enzymes include Lipolase™ and Lipolase Ultra™, Lipex™ and Lipoclean™ (Novozymes A/S).

The method of the invention may be carried out in the presence of phospholipase classified as EC 3.1.1.4 and/or EC 3.1.1.32. As used herein, the term phospholipase is an enzyme which has activity towards phospholipids.

Phospholipids, such as lecithin or phosphatidylcholine, consist of glycerol esterified with two fatty acids in an outer (sn-1) and the middle (sn-2) positions and esterified with phosphoric acid in the third position; the phosphoric acid, in turn, may be esterified to an amino-alcohol. Phospholipases are enzymes which participate in the hydrolysis of phospholipids. Several types of phospholipase activity can be distinguished, including phospholipases $A_1$ and $A_2$ which hydrolyze one fatty acyl group (in the sn-1 and sn-2 position, respectively) to form lysophospholipid; and lysophospholipase (or phospholipase B) which can hydrolyze the remaining fatty acyl group in lysophospholipid. Phospholipase C and phospholipase D (phosphodiesterases) release diacyl glycerol or phosphatidic acid respectively.

The enzyme and the shading dye may show some interaction and should be chosen such that this interaction is not negative. Some negative interactions may be avoided by encapsulation of one or other of enzyme or shading dye and/or other segregation within the product.

Suitable proteases include those of animal, vegetable or microbial origin. Microbial origin is preferred. Chemically modified or protein engineered mutants are included. The protease may be a serine protease or a metallo protease, preferably an alkaline microbial protease or a trypsin-like protease. Preferred commercially available protease enzymes include Alcalase™, Savinase™, Primase™, Duralase™ Dyrazym™, Esperase™, Everlase™, Polarzyme™, and Kannase™, (Novozymes NS), Maxatase™, Maxacal™, Maxapem™, Properase™, Purafect™, Purafect OxP™, FN 2™, and FN 3™ (Genencor International Inc.).

The method of the invention may be carried out in the presence of cutinase. classified in EC 3.1.1.74. The cutinase used according to the invention may be of any origin. Preferably cutinases are of microbial origin, in particular of bacterial, of fungal or of yeast origin.

Suitable amylases (alpha and/or beta) include those of bacterial or fungal origin. Chemically modified or protein engineered mutants are included. Amylases include, for example, alpha-amylases obtained from Bacillus, e.g. a special strain of B. licheniformis, described in more detail in GB 1,296,839, or the Bacillus sp. strains disclosed in WO 95/026397 or WO 00/060060. Commercially available amylases are Duramyl™, Termamyl™, Termamyl Ultra™, Natalase™, Stainzyme™, Fungamyl™ and BAN™ (Novozymes NS), Rapidase™ and Purastar™ (from Genencor International Inc.).

Suitable cellulases include those of bacterial or fungal origin. Chemically modified or protein engineered mutants are included. Suitable cellulases include cellulases from the genera Bacillus, Pseudomonas, Humicola, Fusarium, Thielavia, Acremonium, e.g. the fungal cellulases produced from Humicola insolens, Thielavia terrestris, Myceliophthora thermophila, and Fusarium oxysporum disclosed in U.S. Pat. No. 4,435,307, U.S. Pat. No. 5,648,263, U.S. Pat. No. 5,691,178, U.S. Pat. No. 5,776,757, WO 89/09259, WO 96/029397, and WO 98/012307. Commercially available cellulases include Celluzyme™ Carezyme™, Celluclean™, Endolase™, Renozyme™ (Novozymes NS), Clazinase™ and Puradax HA™ (Genencor International Inc.), and KAC-500(B)™ (Kao Corporation).

Suitable peroxidases/oxidases include those of plant, bacterial or fungal origin. Chemically modified or protein engineered mutants are included. Examples of useful peroxidases include peroxidases from Coprinus, e.g. from C. cinereus, and variants thereof as those described in WO 93/24618, WO 95/10602, and WO 98/15257. Commercially available peroxidases include Guardzyme™ and Novozym™ 51004 (Novozymes NS).

Further enzymes suitable for use are discussed in WO 2009/087524, WO 2009/090576, WO 2009/107091, WO 2009/111258 and WO 2009/148983.

Enzyme Stabilizers

Any enzyme present in the composition may be stabilized using conventional stabilizing agents, e.g., a polyol such as propylene glycol or glycerol, a sugar or sugar alcohol, lactic acid, boric acid, or a boric acid derivative, e.g., an aromatic borate ester, or a phenyl boronic acid derivative such as 4-formylphenyl boronic acid, and the composition may be formulated as described in e.g. WO 92/19709 and WO 92/19708.

Where alkyl groups are sufficiently long to form branched or cyclic chains, the alkyl groups encompass branched, cyclic and linear alkyl chains. The alkyl groups are preferably linear or branched, most preferably linear.

The indefinite article "a" or "an" and its corresponding definite article "the" as used herein means at least one, or one or more, unless specified otherwise.

Dye weights refer to the sodium or chloride salts unless otherwise stated.

Preferably the laundry treatment composition is in a plastic bag, plastic box or a cardboard box.

For ease of use it is preferred that the laundry treatment composition is present in 0.5 to 5 kg packs.

The composition is preferably a liquid detergent. The liquid detergent may be contained within a unit dose, for example 20m 1 of liquid contained within a polyvinyl alcohol film. Within liquid detergents the dye-polymers have the additional advantage of showing low staining to fabric on neat contact of the liquid with fabric. Preferably the pH of the composition when dissolved in water at 2 g/L is in the range 7 to 9.

Domestic wash conditions include, hand washing clothes in water at temperatures of 278 to 335K, preferably 283K to 305K and machine washing in front loading or top loading washing machine at water temperatures of from 278 to 368, preferably 283 to 335K.

EXAMPLES

Example 1

A 50 wt % aqueous solution of a branched PEI core with an average molecular weight of 1300, containing an average of 12 primary, 11 secondary, 8 tertiary nitrogen per PEI, was reacted with propylene oxide in the mol ratio's of 1:0, 1:10 and 1:20 (PEI:PO). After the initial exotherm had subsided (~45° C.) the mixture was stirred at 20° C. for 3 hr followed by heating at 45° C. for 30 min. Following reaction the reactive blue anthraquinone, (reactive blue 261), dye was added in a mol ratio of polymer:dye of 1:0.4, the pH adjusted to 11 and the mix heated at 60° C. for 2 hours. The reaction mixture was then cooled and the pH adjusted to 7 with HCl. The propylene oxide is added to provide iso-propyl alcohol groups bound to the PEI.

A 50 wt % aqueous solution of a branched PEI core with an average molecular weight of 1300, containing an average of 12 primary, 11 secondary, 8 tertiary nitrogen per PEI, was reacted with Tosyl $(CH_2CH_2O)_{12}CH_3$ in the mol ratio's of 1:0, 1:1 and 1:20 (PEI: Tosyl $(CH_2CH_2O)_{12}CH_3$). After addition of the Tosyl $(CH_2CH_2O)_{12}CH_3$ was added to provide the an ethoxylate chain and the mixture stirred at 20° C. for 24 hr. Following reaction the reactive blue anthraquinone dye (Reactive Blue 261) was added in a mol ratio of polymer:dye of 1:0.4 and the mix heated at 60° C. for 2 hours. The reaction mixture was then cooled and the pH adjusted to 7 with HCl. The Tosyl $(CH_2CH_2O)_{12}CH_3$ was added to provide ethoxylate chains bound to the PEI.

Example 2

The following liquid composition was made.

|  | Weight % |
|---|---|
| Linear alkyl benzene sulfonic acid | 8.5 |
| Alcohol ethoxylate (C12-C15 primary alcohol with 7 moles of ethoxylate (EO)) | 12.7 |
| Sodium lauryl ether sulphate(3EO) | 4.3 |
| 1,2-propanediol | 20 |
| N,N-Dimethyl-N-dodecylglycine betaine | 1.5 |
| triethylamine | 3.5 |
| Perfume | 2.4 |
| NaOH | To pH = 6.5 |
| Water | remainder |

The compositions were used to wash a mixture of white fabrics: woven cotton, micro-fibre polyester, and knitted nylon-elastane at a Liquor to cloth ratio of 10:1 in a linitest at room temperature. The fabrics were of equal area. 26° French hard water was used and each wash lasted 30 minutes and was followed by a running rinse. The compositions were all used at 1.4 g/L. The polymers of example 1 were added to the wash liquor to provide a concentration of 20 ppm in the wash. The white cloths were washed three times.

The white cloths were removed, dried and the colour measured using a reflectometer and expressed as the CIE L*a*b* values. The bluing (whiteness) of the dye-polymer was expressed as the Δb value Δb=b(control)−b(dye polymer)

Higher values indicate higher deposition of the dye and higher whiteness

The results are summarized in the table below:

|  | Moles of propylene oxide | Moles of Tosyl $(CH_2CH_2O)_{12}CH_3$ | Δb cotton | Δb poly-cotton | Δb poly-ester |
|---|---|---|---|---|---|
| Reference 1 | 0 | 0 | 0.5 | 0.3 | 0.2 |
| Reference 2 Ethoxylated PEI | 0 | 1 | 0.6 | 0.3 | 0.3 |
| Reference 3 Ethoxylated PEI | 0 | 20 | 0.4 | 0.1 | 0.2 |
| Polymer 1 | 10 | 0 | 1.4 | 1.1 | 1.6 |
| Polymer 2 | 20 | 0 | 1.8 | 1.2 | 2.1 |
| Polymer 3 | 28 | 0 | 4.8 | 4.7 | 7.5 |

Reference 1 is a non-alkoxylated PEI of WO 2011/047987.

Reference 2 is an ethoxylated PEI of WO 2011/047987, with 2.9 mol % of the protons of the primary and secondary nitrogens have been replaced by ethoxy groups.

Reference 3 is an ethoxylated PEI of WO 2012/119859, with 57.1 mol % of the protons of the primary and secondary nitrogens have been replaced by ethoxy groups.

Polymer 1, Polymer 2 and Polymer 3 with 10, 20 and 28 iso-propyl alcohol groups attached to the polymer respectively provides higher whiteness than the reference polymers.

The PEI has an average of 12 primary, 11 secondary, 8 tertiary nitrogen per PEI polymer. Therefore the PEI has an average of (2×12)+(1×11)=35 protons attached to nitrogen atoms. When reacted with 10, 20 and 28 mol equivalents of propylene oxide, 28.6, 57.1 and 80.0 mol % respectively of the protons of the primary and secondary nitrogens have been replaced by an iso-propyl alcohol groups.

The formulations were remade with the addition of the enzyme containing products: 0.1 wt % Celluclean, 0.1 wt % Savinase Ultra, 0.1 wt % Stainzyme plus and 0.1 wt % to Lipoclean (Novozymes A/S).

Example Formulations

Liquid Formulations

|  | LF1 | LF2 | LF3 |
|---|---|---|---|
| Linear alkyl benzene sulfonic acid | 8.0 | 10.0 | 8.0 |
| Alcohol ethoxylate (C12-C15 primary alcohol with 7 moles of ethoxylate (EO)) | 12.0 | 2.0 | 3.0 |
| Sodium lauryl ether sulphate(3EO) | 7.0 | 8.0 | 5.0 |
| Sodium dodecyl sulphate | 0.5 | — | 1.0 |
| C12-C15 fatty acid | 6.0 | 3.0 | 2.5 |
| 1,2-propanediol | 10.0 | 1.0 | 4.0 |
| Glycerol | 5.0 | 1.0 | 4.0 |
| Citric acid | 1.0 | 1.5 | 2.0 |
| EPEI | 3.0 | — | 1.0 |
| Shading dye | 0.005 | 0.003 | 0.006 |
| Fluorescer | 0.001 | 0.002 | 0.003 |
| Polymer 3 of example 1 | 0.03 | 0.07 | 0.1 |
| Perfume | 1.5 | 1.2 | 2.0 |
| Monoethanolamine |  | To pH = 8.2 |  |
| water |  | Remainder |  |

EPEI is a polyethyleneimine (Mw=600) with 20 ethoxylate group per NH.

Shading dye is dye with CAS-No 72749-80-5.

The formulations were remade with the addition of the enzyme containing products: 0.1 wt % Celluclean, 0.1 wt % Savinase Ultra, 0.1 wt % Stainzyme plus and 0.1 wt % Lipoclean (Novozymes A/S).

Powder Formulations

|  | PF1 | PF2 | PF3 |
|---|---|---|---|
| Linear alkyl benzene sulfonic acid | 12.0 | 10.0 | 6.0 |
| Alcohol ethoxylate (C12-C15 primary alcohol with 7 moles of ethoxylate (EO)) | — | 8.0 | 3.0 |
| Sodium dodecyl sulphate | — | 1.0 | 5.0 |
| C12-C15 fatty acid | 1.0 | 3.0 | 2.5 |
| Silicone antifoam | — | 0.5 | — |
| Sodium carbonate | 25 | 15 | 22 |
| Zeolite A | — | 5 | 1 |
| Silicate | — | 5 | 1 |
| Fluorescer | 0.001 | 0.002 | 0.003 |
| Polymer 3 of example 1 | 0.02 | 0.008 | 0.03 |
| Perfume | 1.5 | 1.2 | 2.0 |
| Sodium sulfate |  | remainder |  |

Polymer 3 was added via a spray dried granules as described in WO 2012/172038.

The formulations were remade with the addition of the enzyme containing products: 0.1 wt % Celluclean, 0.1 wt % Savinase Ultra, 0.1 wt % Stainzyme plus and 0.1 wt % Lipoclean (Novozymes A/S).

The invention claimed is:

1. A dye polymer comprising a polyethylene imine covalently bound to a reactive dye, the polyethylene imine having from 6 to 1000000 amine nitrogen atoms, wherein from 20 to 95 mol % of the totality of protons of primary and secondary amine nitrogen atoms of an unsubstituted polyethylene imine are substituted by iso-propyl alcohol groups, and wherein the dye polymer has one of a blue colour or a violet colour.

2. The dye polymer according to claim 1, wherein the polyethylene imine contains from 15 to 45 amine nitrogen atoms.

3. The dye polymer according to claim 1, wherein 57 to 80 mol % of the protons of the primary and secondary amine nitrogen atoms are substituted by iso-propyl alcohol groups.

4. The dye polymer according to claim 1 wherein the reactive group of the reactive dye is selected from heterocyclic reactive groups; 2-bromoprop-2-enamido; 2,3-dibromopropanamido; or, a sulfooxyethylsulfonyl reactive group which is —$SO_2CH_2CH_2OSO_3Na$.

5. The dye polymer according to claim 1 wherein the chromphore of the reactive dye is selected from; mono-azo; bis-azo; or, anthraquinone.

6. The dye polymer according to claim 5, wherein the chromphore of the reactive dye is anthraquinone.

7. The dye polymer according to claim 6, wherein the reactive dye is an anthraquinone dye of the form:

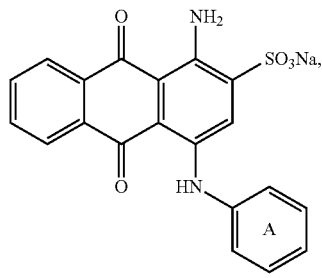

wherein the A ring is substituted by a reactive group selected from: dichlorotriazinyl; difluorochloropyrimidine; monofluorotrazinyl; monofluorochlorotrazinyl; dichloroquinoxaline; difluorotriazine; monochlorotriazinyl; trichloropyrimidine 2-bromoprop-2-enamido; 2,3-dibromopropanamido; or, a sulfooxyethylsulfonyl reactive group which is —$SO_2CH_2CH_2OSO_3Na$.

8. The dye polymer according to claim 7, wherein the A ring is substituted by one or more organic groups selected from: C1-C8-alkyl; or, $SO_3Na$.

9. The dye polymer according to claim 1, wherein the anthraquinone dye is selected from: Reactive blue 1; Reactive blue 2; Reactive blue 4; reactive blue 5; Reactive blue 6; Reactive blue 12; Reactive blue 16; reactive blue 19; Reactive blue 24; Reactive blue 27; Reactive blue 29; Reactive blue 36; Reactive blue 44; Reactive blue 46; Reactive blue 47; reactive blue 49; Reactive blue 50; Reactive blue 53; Reactive blue 55; Reactive blue 61; Reactive blue 66; Reactive blue 68; Reactive blue 69; Reactive blue 74; Reactive blue 86; Reactive blue 93; Reactive blue 94; Reactive blue 101; Reactive blue 103; Reactive blue 114; Reactive blue 117; Reactive blue 125; Reactive blue 141; Reactive blue 142; Reactive blue 145; Reactive blue 149; Reactive blue 155; Reactive blue 164; Reactive blue 166; Reactive blue 177; Reactive blue 181; Reactive blue 185; Reactive blue 188; Reactive blue 189; Reactive blue 206; Reactive blue 208; Reactive blue 246; Reactive blue 247; Reactive blue 258; Reactive blue 261 Reactive blue 262; Reactive blue 263; Reactive blue 172; Reactive Violet 22; Reactive Violet 31; or, Reactive Violet 34.

10. A laundry composition comprising from 0.001 to 2.0 wt % of the dye polymer as defined in claim 1 and from 2 to 70 wt % of surfactant.

11. A method comprising the steps of:
(i) treating a textile with an aqueous dye polymer solution comprising from 10 ppb to 5000 ppm of a dye polymer, wherein the dye polymer comprises a polyethylene imine covalently bound to a reactive dye, the polyethylene imine having from 6 to 1000000 amine nitrogen atoms,
wherein from 20 to 95 mol % of the totality of protons of primary and secondary amine nitrogen atoms of an unsubstituted polyethylene imine are substituted by iso-propyl alcohol groups,
wherein the dye polymer has one of a blue colour or a violet colour, and
wherein the aqueous dye polymer solution further comprise from 0.0 g/L to 6 g/L of a surfactant; and,
(ii) optionally rinsing and drying the textile.

12. The method of claim 11, wherein the aqueous solution comprises from 0.2 to 4 g/L of a surfactant.

13. The method of claim 11, wherein the aqueous solution further comprises a fluorescer in the range from 0.0001 g/l to 0.1 g/l.

14. The dye polymer according to claim 2, wherein 57 to 80 mol % of the protons of the primary and secondary amine nitrogen atoms are substituted by iso-propyl alcohol groups.

* * * * *